Dec. 4, 1928.                                                    1,694,279
J. R. OISHEI
MEANS FOR OPERATING MOTOR VEHICLE ACCESSORY MOTORS
Filed June 21, 1924          6 Sheets-Sheet 1

Fig. 1.

INVENTOR.
John R. Oishei
by
Parker Brockwood Beau
ATTORNEYS.

Dec. 4, 1928.
J. R. OISHEI
1,694,279
MEANS FOR OPERATING MOTOR VEHICLE ACCESSORY MOTORS
Filed June 21, 1924
6 Sheets-Sheet 2

INVENTOR.
John R. Oishei
by Parker, Rockwood & Dean
ATTORNEYS.

Dec. 4, 1928. 1,694,279
J. R. OISHEI
MEANS FOR OPERATING MOTOR VEHICLE ACCESSORY MOTORS
Filed June 21, 1924  6 Sheets-Sheet 3

INVENTOR.
John R. Oishei
by Parker, Prochnow and Bean.
ATTORNEYS.

Dec. 4, 1928.                                                          1,694,279
J. R. OISHEI
MEANS FOR OPERATING MOTOR VEHICLE ACCESSORY MOTORS
Filed June 21, 1924                6 Sheets-Sheet 4

INVENTOR.
John R. Oishei
by Parker, Prichard & Beau
ATTORNEYS.

Patented Dec. 4, 1928.

1,694,279

UNITED STATES PATENT OFFICE.

JOHN R. OISHEI, OF BUFFALO, NEW YORK, ASSIGNOR TO TRICO PRODUCTS CORPORATION, OF BUFFALO, NEW YORK.

MEANS FOR OPERATING MOTOR-VEHICLE ACCESSORY MOTORS.

Application filed June 21, 1924. Serial No. 721,439.

This invention relates to means for producing fluid under a pressure greater than one atmosphere for use in the actuation of accessory or working parts on motor vehicles and the like by utilizing a portion of the suction created during the normal operation of a vehicle engine.

Automobile accessories such as automatic, fluid pressure actuated, windshield wipers have been provided which are operable directly by suction produced by the engine of a motor vehicle, as by connecting the intake manifold, or a suction passage located between said engine and the fuel supply therefor, with the accessory motor. This motor usually comprises a casing having a piston movable therein alternately in opposite directions, which piston is operably connected to a shaft or the like which operates the windshield wiper or other accessory. The piston is actuated by a difference in pressures between suction in a duct leading directly from the engine to one side of the piston and air at substantially normal atmospheric pressure on the other, the suction and air pressures being admitted to first one side and then the other, under the control of valves and a valve reversing mechanism arranged in or on the motor casing.

The utilization of the relatively small suction available under the conditions stated, together with air at a pressure of one atmosphere, does not give a sufficiently great difference in pressures to operate the accessory motor under all conditions of operation of a motor vehicle. For instance, the suction varies widely between the times when the throttle of the engine is open and when it is closed; also the accessory motor piston sometimes sticks in the piston chamber, noticeably at the ends of its stroke, due to the adhesive action of the lubricant, and other causes. Further, the valves and reversing mechanisms therefor, which, as stated, are arranged on the accessory motor casing, make considerable noise when in operation, due not only to the relative movements and engagement of the mechanical parts, but also on account of the wheezing or whistling noise of the inrushing air to the valves, thus causing considerable annoyance to the driver of the car, and sometimes distracting his attention from his duties. It has also been fuond that the valves and actuating mechanism for the valves, at times, offer a resistance to the suction greater than the resistance offered by the accessory motor piston itself, sufficient to seriously interfere with the proper operation of the accessory. This is particulraly noticeable under low suction.

One of the objects of the present invention is to provide means whereby suction at low pressures and relatively small volume, may be utilized to create a pressure of relatively greater power, as by compressing air, so that by using the compressed air to operate against low suction alternately on the opposite sides of an accessory motor piston, a relatively great diference in pressures may be obtained, sufficient to make more positive the actuation of the accessory under all conditions of operation of the vehicle engine.

Another object is to provide a suitable air compressor or device, operable by the low suction of the vehicle engine, and adapted to utilize the low suction to provide a relatively large amount of power by compressing air admitted to the compressor at normal atmospheric pressure; also to provide means associated with said compressor whereby the suction and air admitted thereto and compressed air and suction therefrom may be carried to and automatically controlled for the actuation of the accessory motor.

Another object is to construct an air compressor and an accessory motor so that a single automatic valve mechanism associated with the compressor may be utilized to control both the air compressor and the accessory motor, whereby the usual valves and reversing mechanism on the accessory motor may be eliminated, together with the noise attendant upon their use, as well as eliminating the resistance set up thereby.

Still another object is to simplify and improve the construction and operation of devices of this sort in other respects hereinafter set forth and claimed.

In the accompanying drawings I have illustrated a type of motor suitable for operating an automatic windshield wiper, but it is understood that other forms of accessory motors for other purposes may be used.

Figs. 15ª, 16ª, 17ª and 18ª are similar figures on lines 15ª—15ª, 16ª—16ª, 17ª—17ª and 18ª—18ª, respectively, Fig. 14, taken in the same relative planes as Figs. 15–18, but showing the controlling valve in its other position relative to the valve sleeve and valve casing.

The preferred embodiment of the present invention comprises, generally, a motor vehicle accessory motor having a piston arranged in a substantially air-tight cylinder or piston chamber, said piston being connected to a shaft adapted to operate the accessory, said accessory being a windshield wiper in the particular use illustrated. The motor piston is actuated to move the wiper alternately in opposite directions by use of compressed air in conjunction with suction introduced alternately on opposite sides of the piston.

The compressed air is produced by an air compressor adapted to be actuated by the suction created by the motor of the vehicle and controlled by an automatic valve mechanism between the compressor and the source of suction. The compressor preferably includes a suction chamber and oppositely disposed compression chambers, and a piston arranged in the suction chamber and adapted to be actuated upon by the differences in pressures on opposite sides thereof in the suction chamber to reciprocate alternately in opposite directions, and which is provided with portions extending into the compression chambers to compress air alternately in one and then the other of these chambers. The movements are controlled by an automatic valve and reversing mechanism, preferably actuated by the movement of the piston, so that the compressed air is delivered first to one side of the accessory motor piston and then to the other side thereof, the opposite side of the piston chamber in each case preferably being under suction, whereby a substantial difference in pressures is attained on opposite sides of the accessory motor piston.

The automatically controlled motor may be of any suitable construction, but as shown in the drawings, preferably comprises a substantially air-tight casing A, having formed therein the piston chamber 10, in which is arranged the piston B. The piston B is secured to one end of a rock shaft 11, the other end being adapted to receive the windshield wiper-carrying arm 12, to which the wiper member 13 is attached. The wall 14 of the piston chamber 10 is curved on an arc, the center of which coincides with the axis of the rock shaft 11 and the end and sides of the piston blade are formed to coincide with and closely fit the curved wall 14 and side walls 15 of the chamber 10. Compressed air and suction ports 16 and 17 are arranged at the opposite ends of the motor casing A. These ports are adapted to connect respectively with air pressure and suction conduits or passages 16ª and 17ª and also with the opposite ends of the piston chamber 10, and each port serves alternately as a compressed air inlet port and a suction exhaust port, so that as compressed air is admitted to one end of the chamber through one of said ports to act against and move the piston B away from that end of the chamber, suction is acting through the other port to exhaust the air from the other side of the piston chamber., thereby assisting the compressed air in actuating the piston by the difference in pressures on opposite sides thereof.

The compressor is preferably constructed so as to have a relatively large piston area under suction influence while the compression areas of the piston which work in the compression chambers have a relatively smaller area, so that the compressor is adapted to exert a powerful compressing action on the air in the compression chambers.

Figure 1:
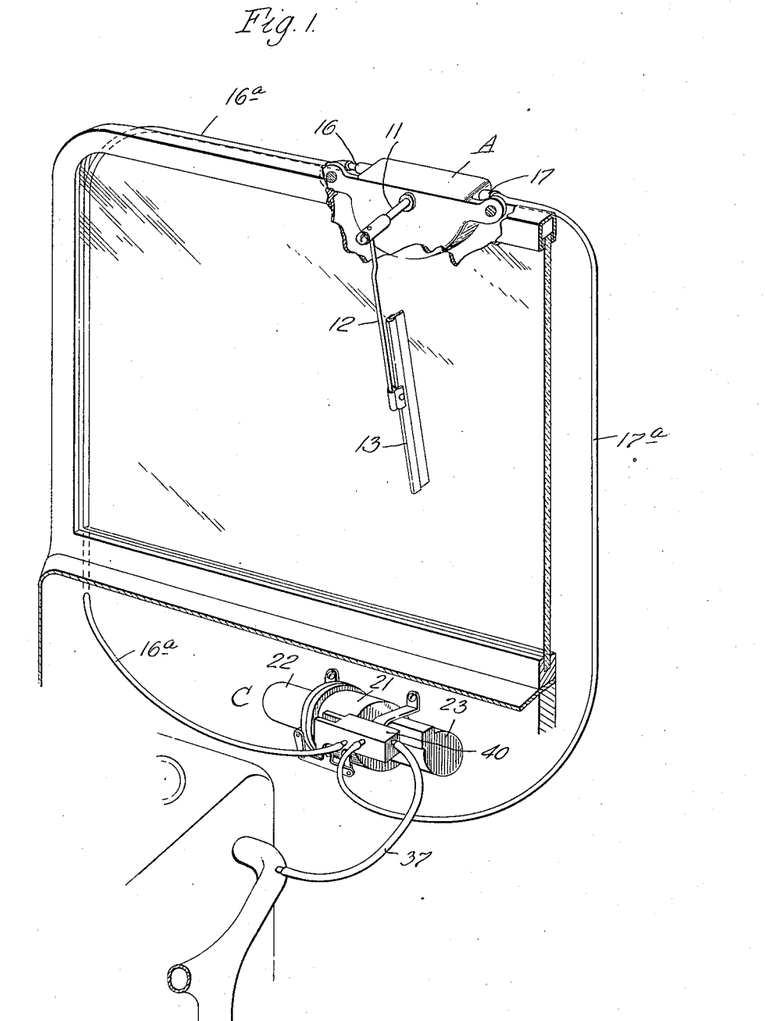
Fig. 1 is a perspective view of a portion of a motor vehicle and its engine, provided with an automatic windshield wiper and means in the form of an air compressor and a controlling device actuated by suction from said engine for compressing air for the actuation of the wiper motor, said compressor, controlling device and wiper motor being constructed and arranged in accordance with the invention.
Figure 2:
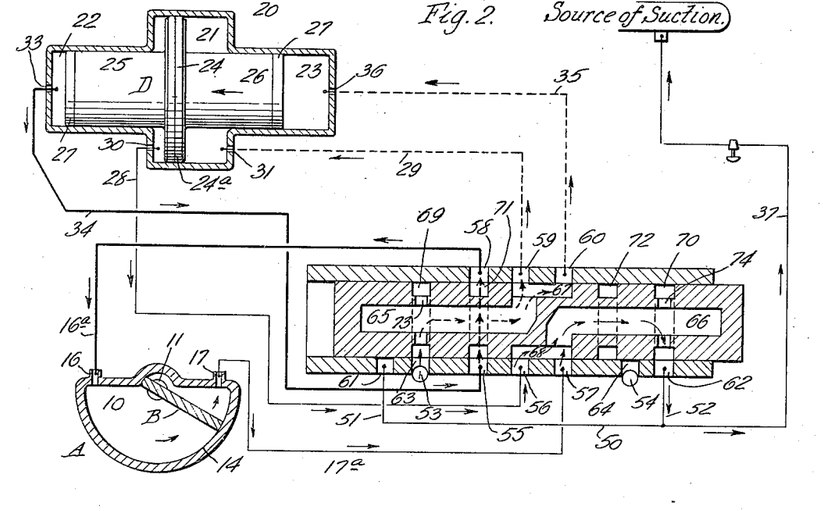
Figs. 2 and 3 are diagrammatic views showing the compressor, the accessory motor and the automatic valve for controlling the action thereof, all of these parts being in different positions in the two figures.

The compressor C shown in the drawings preferably comprises a casing 20 having a central cylindrical suction chamber 21 and cylindrical compression chambers 22 and 23 extending in opposite directions therefrom. A piston D having a central disk or piston head 24 provided with packing gaskets 24$^a$ is adapted to engage the inner annular wall of the suction chamber 21, while oppositely-directed cylindrical compression heads 25, 26 extending from opposite sides of the piston head 24 are adapted to extend into the compression chambers 22, 23, respectively. The compression heads 25, 26 are each provided with a packing gasket 27 fitting closely against the cylindrical walls of the compression chambers. To actuate the piston and move it alternately in opposite directions, suction is conveyed first to one side of the suction chamber 21 and then to the other, as by the conduits 28, 29, formed in the compressor casing, which connect with ports 30, 31 opening into opposite sides of the suction chamber 22, as shown in Figs. 2, 3, 6 and 10. In Fig. 2, suction is acting on the piston head 24 through port 30, while air at normal atmospheric pressure is passing into the right hand side of the suction chamber, on the opposite side of the piston head 24, thus moving the piston D toward the left. This movement results in the compression of air in the compression chamber 22, which compressed air is permitted to escape through a port 33 into a conduit 34. At this time air also enters the other compression chamber 23 by way of a conduit 35 and port 36. If, however, suction is introduced into the opposite side of the suction chamber 21, by way of conduit 29 and port 31 (see Fig. 3), the piston head 24 will be acted upon to move the piston D in the opposite direction, or towards the right, thus compressing air in the compression chamber 23, while atmospheric air enters the opposite side of the chamber 21 through conduit 28 and port 30 and also enters the other compression chamber 22 by way of conduit 34 and port 33. The air which is compressed in the chamber 23 at this time, escapes by way of port 36 and conduit 35.

Figure 3:
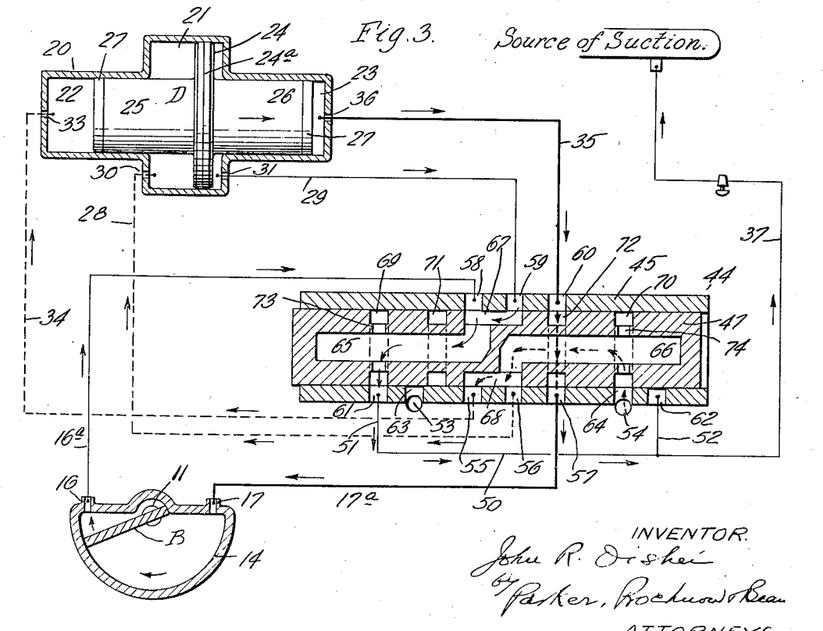

In the particular arrangement disclosed in the drawings and illustrated in Figs. 2 and 3, the compressed air from the compression chamber 22 is delivered to the port 16 of the accessory motor by way of the conduits 34 and 16$^a$ while the compressed air from the other compression chamber 23 is delivered to the port 17 of the wiper motor through the conduits 35 and 17$^a$.

The suction used for the operation of the compressor and the accessory motor piston and obtained from the vehicle engine is conveyed therefrom in any suitable manner, as by means of a conduit 37 leading from any convenient point between the fuel supply and the intake of the engine. This point may be at the intake manifold or at the suction side of the vacuum feed tank, when one is used, or at any other desirable point.

The conduit 37 communicates with the automatic means by which the suction influence and air at atmospheric pressure is directed alternately to opposite sides of the compressor; the compressed air from the opposite sides thereof, together with the suction influence being also controlled by said means and directed alternately to opposite sides of the accessory motor casing. These automatic means are preferably arranged on or adjacent the compressor casing and are preferably constructed as follows:—

A valve box 40, see particularly Figs. 13–22, is secured as by screws 41 to a projecting part 42 of the compressor casing, at the face of which the ends of the suction conduits 28, 29 and the compressed air conduits 34, 35 are exposed, passages 28$^a$ and 29$^a$ and 34$^a$ and 35$^a$ in the valve box 40 registering with said exposed ends of the respective conduits 28, 29, 34, 35. A valve sleeve 44, having an annular or hollow cylindrical wall or body portion 45 is rigidly secured in a cylindrical bore 46 of the valve box 40, and a cylindrical valve 47 is adapted to slidably fit or seat within the body portion 45 of the valve sleeve and is reciprocable therein to the right and left hand positions shown respectively in Figs. 13 and 14, 19 and 20, by means to be later described.

The valve box 40 is further provided with a horizontal suction passage 50 ending in downwardly extending branches 51, 52. The passage 50 extends to one end of the valve box and is there connected to the suction supply duct 37, while extending upwardly from the bottom face of the valve box are two air admission passages 53, 54. Two forwardly extending passages 16$^b$ and 17$^b$ in the valve box 40 are adapted to connect the conduits 16$^a$ and 17$^a$ respectively from the accessory motor. The valve sleeve 44 is formed on its upper side with a series of three horizontal spaced ports or inlets 55, 56, and 57, which are cut through the wall 45 to connect with the valve 47. A similar series of ports 58, 59, and 60 is formed on the lower side of the valve sleeve, while similarly formed section ports 61, 62 and air ports 63, 64 are cut vertically into its outer or front face, and connect respectively with the suction passages 51, 52 and air passages 53, 54. The passages 16$^b$ and 17$^b$ before mentioned connect respectively with the valve sleeve ports 58 and 57. The valve 47 is formed with two longitudinal central ducts 65, 66 extending inwardly to points substantially midway between its ends where they connect respectively with outlets 67, 68 formed by cutting away portions of the outer wall of the valve. The outer ends of the ducts 65, 66 are closed, as by the plugs 65$^a$, 66$^a$ or otherwise. A series of four annular grooves or ports 69, 70, 71, 72 are formed at intervals around the valve 45, the ports 69, 70 being suction and air ports which communicate respectively with the valve ducts 65, 66 by means of radial apertures 73, 74. As shown in Figs. 13, 14, 19 and 20, the valve 47 extends outwardly beyond the left end of the valve box 40 and is there provided with spaced shoulders or parts 75, 76, while the valve box has a pair of spaced lugs 77. A stop pin 78 is secured to these lugs so as to extend between them into the path of the shoulders 75 and 76 of the valve, the shoulders being spaced so that as they alternately engage the stop 78 the ports in the valve will be in proper position relatively to the ports in the sleeve 40.

The operation and relative movements of the compressor piston, accessory motor piston, and the valve 45 as thus far described is as follows:—

As shown in Figs. 2, 13, 15–19 and 21, the valve 45 is in its right hand position, and at this time the suction influence through the duct 37 passes by way of the branch passage 52, ports 62, 70 and radial apertures 74 through the valve duct 66, thence by way of outlet 68 and port 56, passage 28$^a$, conduit 28 and port 30 to the left hand side of the suction chamber 21 of the compressor thereby moving the piston D to the left, as shown. In this right hand position of the valve 47, the outlet 68 also connects the duct 66 with the port 57 in the sleeve, so that suction is applied through the conduit 17$^a$ to the port 17 of the accessory motor to draw air from the right hand side of the piston chamber 10, thereby acting on one side of the piston B to move it to the right. Meanwhile the compression head 25 of the piston D is compressing air in the compression chamber 22 and this compressed air is delivered to the other side of the piston B in the accessory motor piston chamber 10 to act in conjunction with the suction on the other side of the piston B to move it to the right. The compressed air is delivered through port 33, conduit 34, passage 34$^a$, ports 55, 71, and 58, conduit 16$^a$ and port 16. During the aforesaid movement of the piston D to the left it is necessary to deliver air to the compressor C for relieving or preventing vacuum in the inoperative side of the suction chamber 21 and in the compression chamber 23 of the compressor. This air at atmospheric pressure, is delivered under the control of the valve 47 by way of the air duct 53 and port 63 and radial passages 73 to the valve duct 65, and thence by way of outlet 67, port 59, passage 29$^a$, conduit 29 and port 31 to the suction chamber 21; and as the outlet 67 also connects the duct 65 to the port 60, the air is also delivered to passage 35$^a$, conduit 35 and the port 36 to the compression chamber 23.

Figures 14, 15, 16, 17, 18:
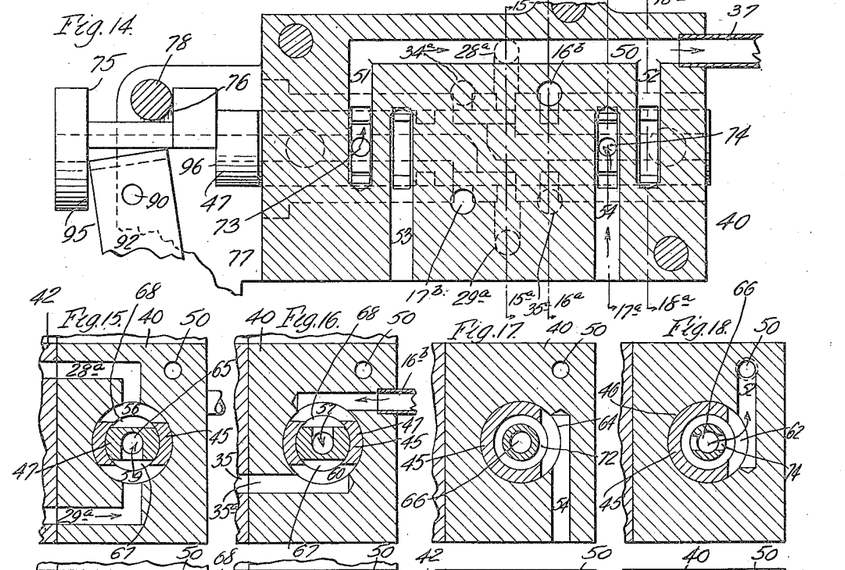
Figs. 15, 16, 17 and 18 are transverse sections on lines 15—15, 16—16, 17—17 and 18—18, respectively, Fig. 13, showing the relation of the controlling valve to the valve sleeve and valve casing.
Figure 15A:
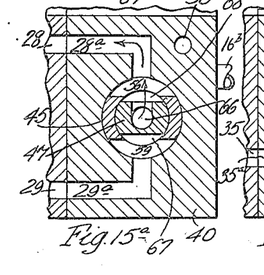
Figures 16A, 17A, 18A:
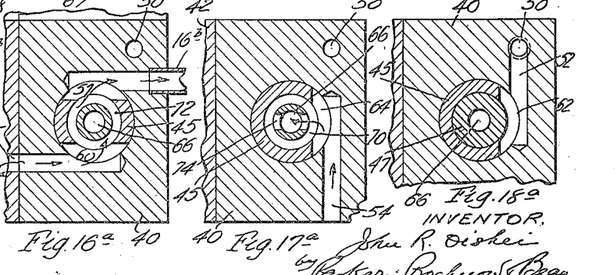
Figure 19:
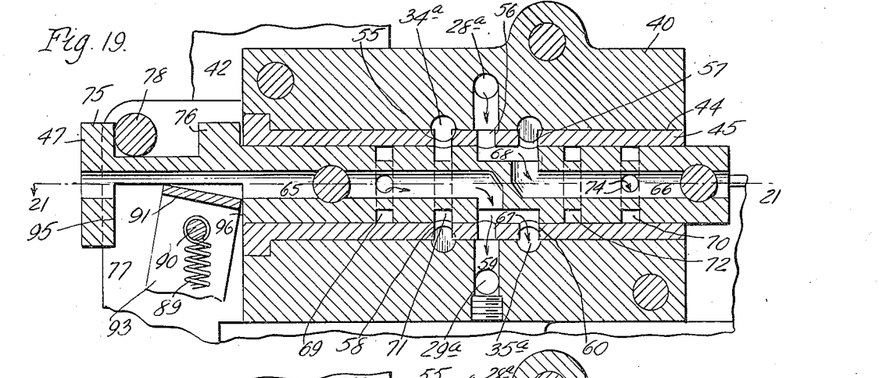
Figs. 19 and 20 are central longitudinal, vertical sections on line 19—19, Fig. 21, showing respectively the right and left hand positions of the automatic controlling valve.
Figure 20:
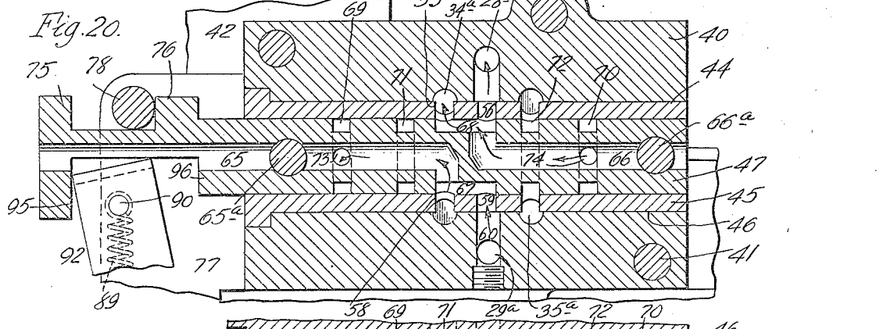
Figure 21:
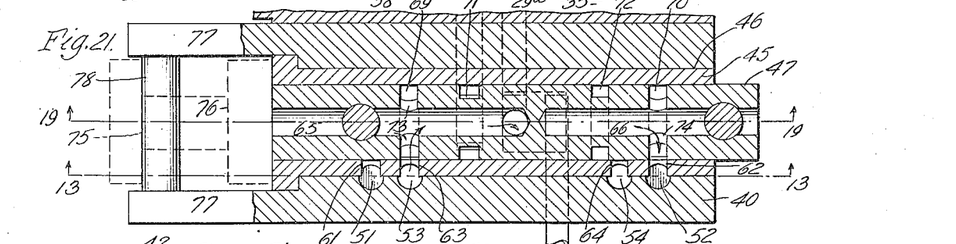
Figs. 21 and 22 are horizontal sections on line 21—21, Fig. 19, showing respectively the right and left hand positions of the automatic controlling valve.
Figure 22:
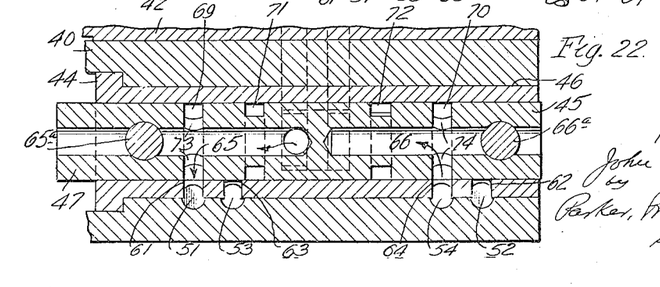

After the piston D of the compressor has completed its compression stroke to the left, by the action of the suction on the disk 24, as explained, and the accessory piston B has completed its stroke to the right, the valve 47 is actuated by the reversing mechanism (to be described) and is thereby moved to the left hand position shown in Figs. 3, 14, 15$^a$ 18$^a$, 20 and 22 with its shoulder 76 in engagement with the stop pin 78. The piston D will then move to the right by the action of the suction which will now be delivered to the other side of the suction piston 24 through port 31. In this case the suction influence from conduit 37 communicates by way of duct 50, branch 51, ports 61, 69 and radial passages 73 with valve duct 65, thence through outlet 67, port 59, passage 29$^a$ and conduit 29 with port 31 of the suction chamber 21, and by acting on the right hand side of suction disk, piston 24 tends to move the piston D to the right. This movement causes the compression head 26 to deliver compressed air through port 36, conduit 35 and passage 35$^a$ to ports 60, 72 and 57 to passage 17$^b$, conduit 17$^a$ and port 17 to the right hand side of the accessory motor piston B, thereby moving it towards the left. At the same time suction influences communicate with the opposite side of the piston B from the valve duct 65 and outlet 67 by way of port 58, passage 16$^b$, conduit 16$^a$ and port 16. The necessary air at atmospheric pressure, for the relief of the suction and compression chambers 21, 22 during the aforesaid right hand travel of the piston D is delivered, under the control of the valve 47 through air ducts 54 ports 64, 70 and radial passages 74 to valve duct 66 and thence by way of outlet 68, port 56, passage 28$^a$ and conduit 28 to suction port 30, and also from outlet 68, port 55, passage 34$^a$ and conduit 34 to port 33 in compression chamber 22. In Figs. 2 and 3 the paths of travel of the suction influences, compressed air and atmospheric air are shown by light full lines, heavy full lines and broken lines respectively, to assist in an understanding of the invention.

From the foregoing it will be seen that when suction is present in conduit 37 the initiation of the valve 47 alternately to right and left causes the reciprocation of the compression piston D and the desired oscillation of the accessory motor piston B to move the wiper member back and forth over the windshield glass.

Figure 4:
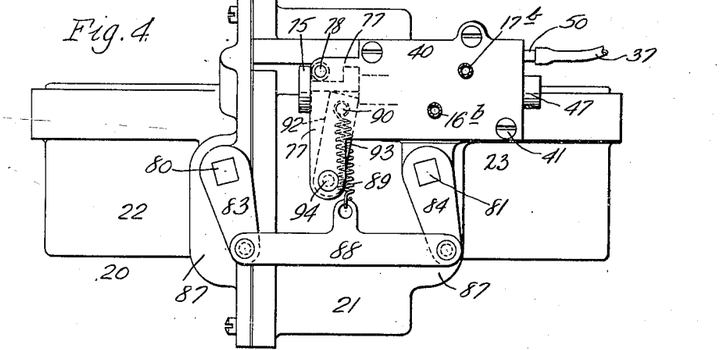
Fig. 4 is a side elevation of the air compressor, automatic valve and reversing mechanism.
Figure 5:
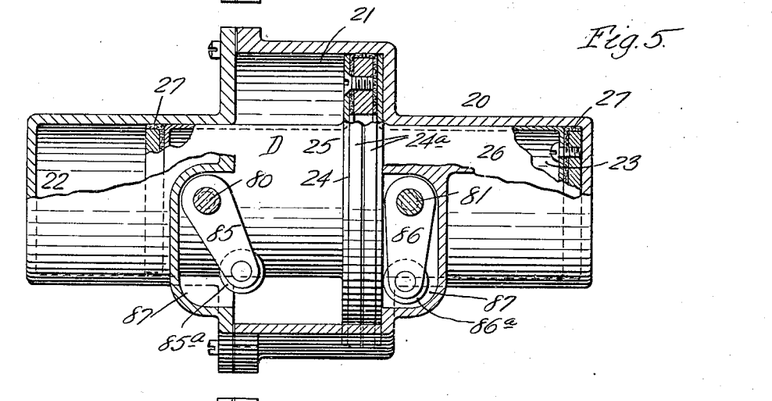
Fig. 5 is a sectional elevation of the air compressor, showing the compressor piston in engagement with the valve reversing mechanism.
Figure 6:
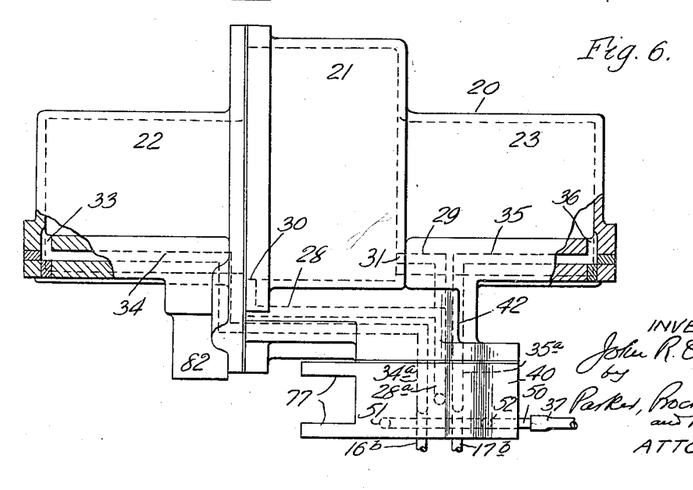
Fig. 6 is a plan view, partly in section, of the air compressor, showing the arrangement of the various ducts leading from the automatic valve casing to the compressor, the reversing mechanism and the controlling valve being omitted.
Figures 7, 8, 9, 10:
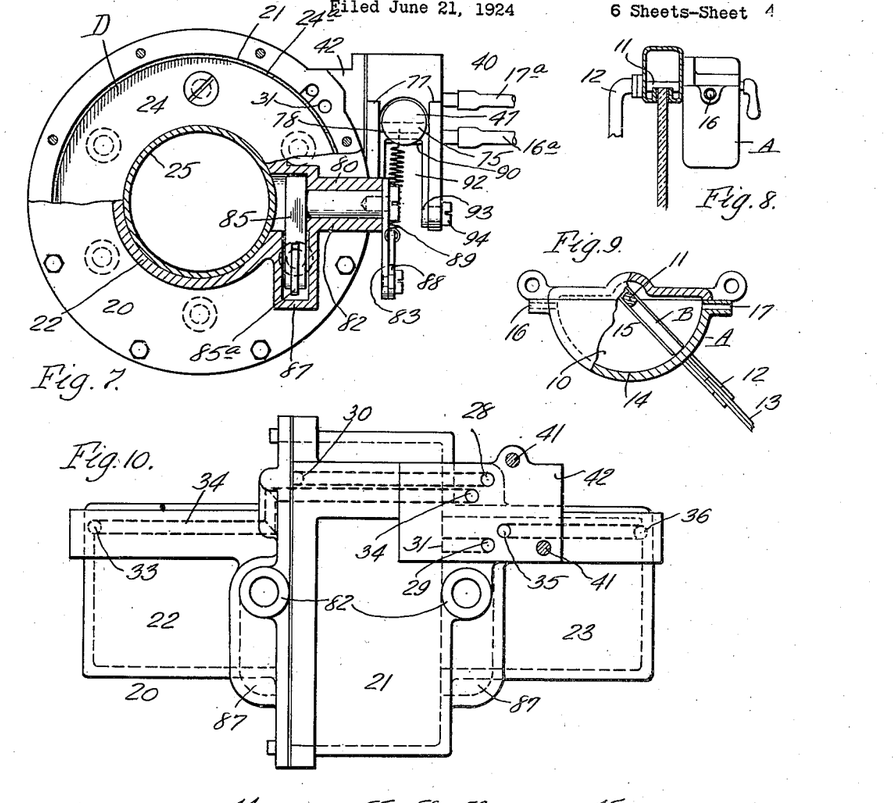
Fig. 7 is an end view, partly in section, of the air compressor, automatic controlling valve and reversing mechanism.
Fig. 8 is an end view of a windshield wiper motor adapted to be used in connection with the invention.
Fig. 9 is a side elevation, partly in section, thereof.
Fig. 10 is a side elevation of the air compressor casing with the automatic controlling valve and reversing mechanism removed, and showing the ducts leading to the suction and compression chambers of the compressor.
Figure 11:
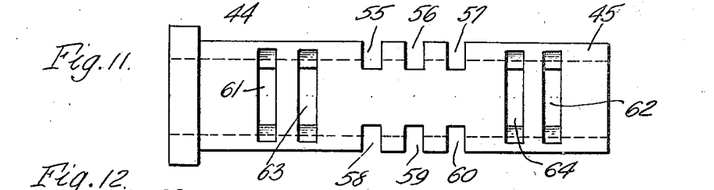
Fig. 11 is a side elevation of the valve sleeve for the automatic controlling valve, removed from the valve casing.
Figure 12:
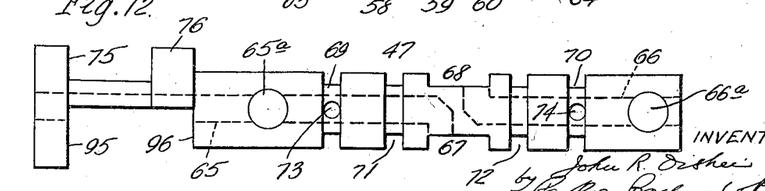
Fig. 12 is a side elevation of the automatic controlling valve removed from the valve casing.
Figure 13:
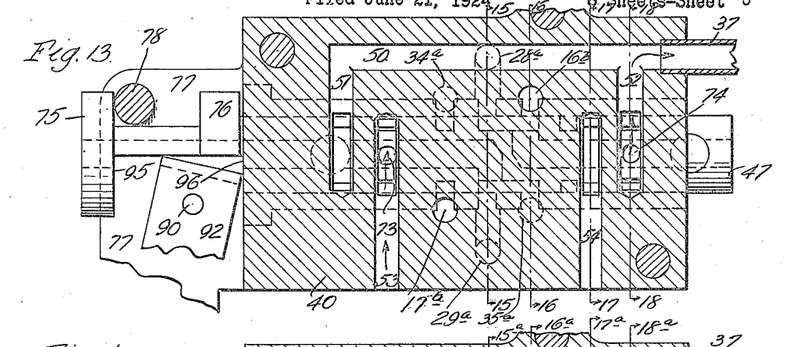
Figs. 13 and 14 are sectional views on line 13—13, Fig. 21, showing respectively the right and left hand operative positions of the automatic controlling valve.

Any suitable means may be provided for initiating the movements of the valve 47, as described, the preferred means comprising a reversing mechanism adapted to have a part engaging the valve and a part engaged by the piston D at the completion of its stroke in each direction. The engagement of the piston D with the reversing mechanism causes a movement of the valve-engaging part thereof to move the valve 47 to its other position. The reversing mechanism shown in the drawings (see Figs. 4, 5, and 7,) comprises a pair of parallel transverse rock shafts 80, 81 journalled in holes in forwardly extending bosses 82 on the compressor casing. These arms 80 and 81 are provided with fixed rock arms 83 and 84 respectively on their outer ends, and fixed arms 85 and 86 on their inner ends are adapted to carry at their free ends rollers 85ª and 86ª respectively. The rock shafts are prevented from endwise displacement by the arms at their ends. As shown in Figs. 5 and 7 each of the arms 85 and 86 is adapted to extend into a pocket 87, the pockets being formed as lateral extensions of the suction chamber 21. In Figs. 4 and 5 the rock shafts 80 and 81 are in the same positions, and it will be seen therefore, that while the outer arms 83, 84 extend parallel to each other, the roller arms 85, 86, have a different angular relation to each other and to the arms 83, 84, such that when one of these inner arms is extending into its pocket 87 the other extends with its roller out of its pocket into the path of movement of the suction disk 24 of the piston D. The free ends of the arms 83, 84 are pivotally connected to the opposite ends of a link 88 to the middle or intermediate portion of which is connected one end of a tension coil spring 89. The other end of this spring 89 engages a pin or stud 90 secured adjacent across bar or bridge portion 91 of a trip or snap device 92. This device is provided with depending spaced leg portions 93, the ends of which are pivotally connected, as at 94 to depending portions of the lugs 77, before mentioned. The cross bar 91 is positioned adjacent the extending end of the valve and is adapted to alternately engage one or the other of a pair of stop shoulders 95, 96, on the valve to move it alternately to its right and left hand positions. Upon referring to Fig. 4 it will be seen that the lower end of the spring 89 is located to the right of the pivots 94, and pin 90 is also at the right or beyond the dead center position. If, now, the link 88 be moved to the left far enough to carry the lower end of the spring 89 to the left beyond the pivots 94, the spring will be placed under sufficient tension to snap the pin 90 and adjacent cross bar 91 of the trip device quickly to the left beyond the dead center position. This movement causes the cross bar 91 to engage the stop 95 and move the valve quickly from its right hand to its left hand position, where it will be positively held by the engagement of the shoulder 76 with the stop pin 78. A reverse movement of the link 88 causes the cross bar 91 to snap over into engagement with the stop 96, thus moving the valve back to its right hand position, with its shoulder 75 engaging the stop pin 78.

The necessary movement of the link 88 is preferably effected through the alternate engagement of the suction disk 24 with the rollers 85ª and 86ª in its reciprocating movements from one side of the suction chamber 21 to the other, as shown in Fig. 5, the piston D is in its right hand position, with the suction disk 24 engaging the roller 86ª and holding it to the right in the pocket 87, and, through the described connection of the rock shafts 81 80, arms 84, 83, and link 88, the other arm 85 and roller 85ª has been moved to the position shown, in the path of movement of the suction disk 24 when returning to the left. The engagement of the disk 24 with the roller 85ª will therefore rock the shaft 80 and swing its arm 83 to the left, thus actuating the spring to swing the snap device through the link 88 so that the valve will be moved quickly to its left hand position, and the other roller 86ª will be positioned for the interception of the suction disk 24 upon its return to the right. Any other reversing mechanism may be used to actuate the valve alternately in opposite directions as required.

I claim as my invention:

1. The combination with a fluid pressure operated accessory motor having a piston therein adapted to be moved alternately in opposite directions, of means for utilizing suction, as created in the normal operation of a vehicle internal combustion engine to produce a fluid pressure substantially above one atmosphere, said fluid pressure and said suction being adapted to be operatively communicated to said accessory motor at opposite sides of said piston to move said piston and actuate said accessory.

2. The combination with a fluid pressure operated accessory motor having a piston therein adapted to be moved alternately in opposite directions, of means for utilizing suction, as created in the normal operation of a vehicle internal combustion engine to produce a fluid pressure substantially above one atmosphere, and means for communicating said fluid pressure and said suction to said accessory motor alternately on opposite sides of said piston to move said piston and actuate said accessory alternately in opposite directions.

3. The combination of a fluid pressure operated accessory motor connected to and adapted to actuate an automobile accessory, a piston in said accessory motor adapted to be moved alternately in opposite directions and operatively connected to said accessory, a source of low fluid pressure as obtained by utilizing the partial vacuum developed in the normal operation of the vehicle internal combustion engine, means operable by the difference in pressures between said source of low pressure and the atmosphere for compressing air, and means for operatively communicating said compressed air and said partial vacuum to said accessory motor at opposite sides of said piston to move said piston and actuate said accessory.

4. The combination of a fluid pressure operated accessory motor connected to and adapted to actuate an automobile accessory, a piston in said accessory motor adapted to be moved alternately in opposite directions and operatively connected to said accessory, a source of fluid pressure substantially below one atmosphere, as obtained by utilizing the suction developed in the normal operation of a vehicle internal combustion engine, a suction-operated air compressor operably connected to said source to produce fluid pressure greater than one atmosphere, and means for operatively connecting said relatively high fluid pressure and said low fluid pressure to said accessory motor at opposite sides of said piston to move said piston and actuate said accessory.

5. The combination with a fluid pressure operated accessory motor having a piston therein adapted to be moved alternately in opposite directions, of means for utilizing suction, as created in the normal operation of a vehicle internal combustion engine to produce a fluid pressure substantially above one atmosphere, conduits for conducting said fluid pressure and said suction to said accessory motor, and means for controlling said fluid pressure and said suction whereby said influences are communicated alternately to opposite sides of said accessory motor piston to move said piston alternately in opposite directions.

6. The combination with a fluid pressure operated accessory motor having a piston therein adapted to be moved alternately in opposite directions, of means for utilizing suction, as created in the normal operation of a vehicle internal combustion engine to actuate compressing means to produce a fluid pressure substantially above one atmosphere, conduits for communicating said fluid pressure and said suction to said accessory motor, and a controlling valve in said conduits between said compression means and said accessory motor for controlling said fluid pressure and said suction whereby said influences are communicated alternately to opposite sides of said accessory motor piston to move said piston alternately in opposite directions.

7. The combination with a fluid pressure operated accessory motor having a piston therein adapted to be moved alternately in opposite directions, of a source of suction created in the normal operation of a vehicle internal combustion engine, a compression device having a reciprocable member therein adapted to produce a fluid pressure substantially above one atmosphere, means for connecting said suction to said compression device to operate said reciprocable member, and a reciprocable controlling valve actuated by the alternating movements of said reciprocable member for controlling said fluid pressure and said suction whereby said influences are communicated alternately to opposite sides of said accessory motor piston to move said piston alternately in opposite directions.

8. The combination with a fluid pressure operated accessory motor having a piston therein adapted to be moved alternately in opposite directions, of a source of suction created in the normal operation of a vehicle internal combustion engine, a compression device having a reciprocable member therein adapted to produce a fluid pressure substantially above one atmosphere, means for connecting said suction to said compression device to operate said reciprocable member, and a reciprocable controlling valve adapted to control said suction to said compression device for operating said reciprocable member, said controlling valve being also adapted to control said fluid pressure and said suction whereby said influences are communicated alternately to opposite sides of said accessory motor piston to move said piston alternately in opposite directions.

9. The combination with a fluid pressure operated accessory motor having a piston therein adapted to be moved alternately in opposite directions, of a source of suction created in the normal operation of a vehicle internal combustion engine, a compression device having a reciprocable member therein adapted to produce a fluid pressure substantially above one atmosphere, means for connecting said suction to said compression device to operate said reciprocable member, and a reciprocable controlling valve adapted to control said suction to said compression device for operating said reciprocable member, reversing means actuated by the movements of said reciprocable member for reciprocating said controlling valve, said valve being also adapted to control said fluid pressure and said suction whereby said influences are communicated alternately to opposite sides of said accessory motor piston to move said piston alternately in opposite directions.

10. An air compressing mechanism for vehicle accessory motors, comprising a casing having an enlarged central chamber from which smaller compression chambers extend in opposite directions, a compound piston having a central enlarged head operable in the central chamber and oppositely extending and comparatively reduced compressor heads operable in the compression chambers, valve mechanism on the casing for alternately connecting the oposite ends of the central chamber to a source of operating pressure and for alternately connecting the outer ends of the compression chambers to an accessory motor, and means operable by and during movement of the piston for actuating the valve mechanism.

11. A fluid pressure motor comprising a casing, a piston reciprocal therein, spaced rock shafts journalled in the casing, spaced rocker arms fixed on the inner ends of the rock shafts and arranged in the casing, said piston having a part within the casing reciprocal between and successively rocking said arms, exteriorly arranged arms fixed on the outer ends of the shafts, a connector between said exteriorly arranged arms, valve means for operatively applying fluid pressure to the piston, and means operable by the connector for controlling the valve means.

12. A fluid pressure motor comprising a casing, a piston reciprocal therein, spaced rocker arms pivoted on the casing, said piston having a part reciprocal between and successively engaging said arms to rock the same, a connector between the arms and reciprocal thereby, valve means for operatively applying fluid pressure to the piston, a pivoted trip member connected to said valve means for controlling the same, and a spring operatively connecting the trip member to the connector for movement by the latter under tension to opposite sides of the pivot of said trip member.

JOHN R. OISHEI.